(No Model.)  3 Sheets—Sheet 1.
S. F. WEAVER.
CORN HARVESTER.
No. 286,882.  Patented Oct. 16, 1883.
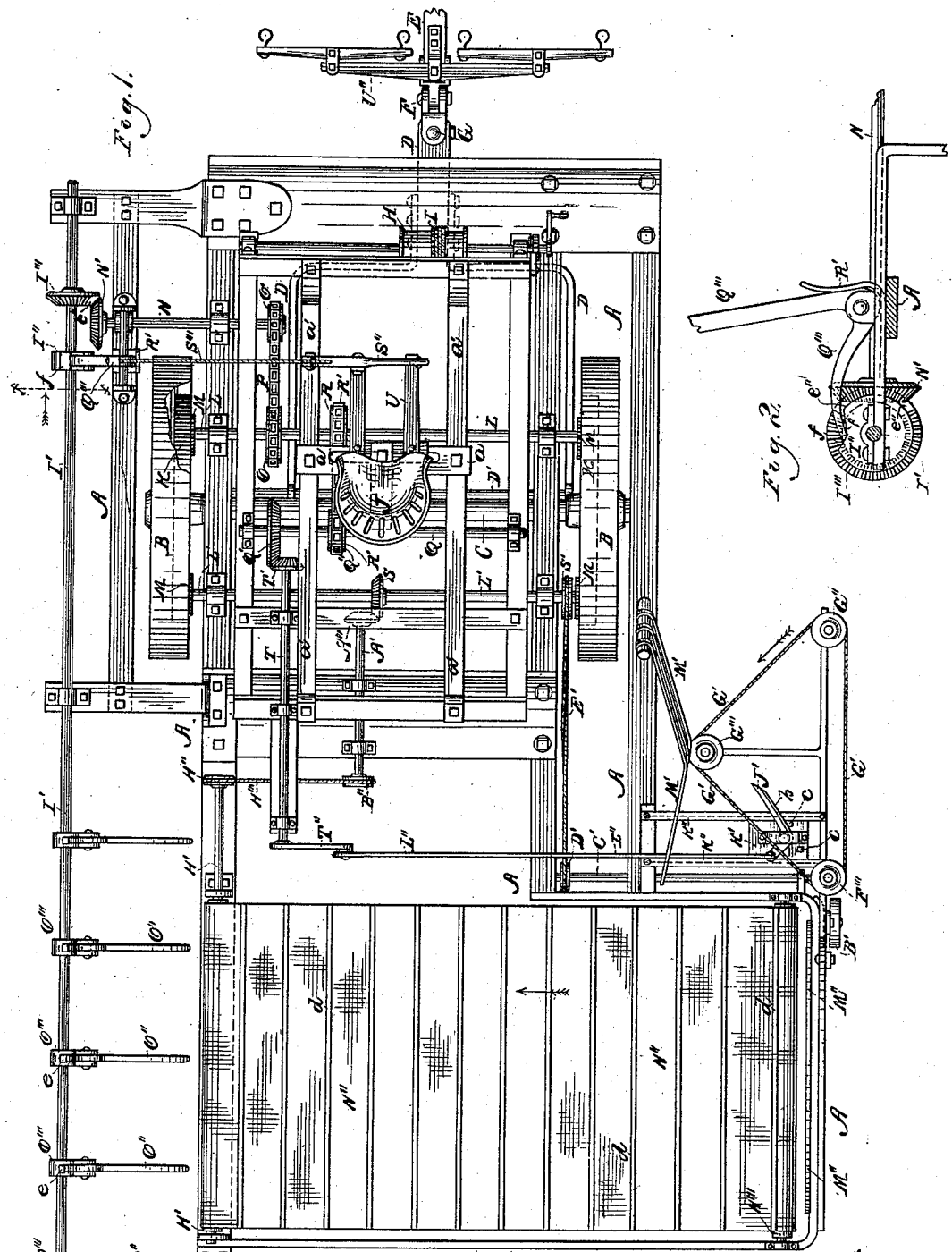
Witnesses.
Inventor.
Solomon F. Weaver
per F. F. Warner
his Attorney.

(No Model.) 3 Sheets—Sheet 2.
S. F. WEAVER.
CORN HARVESTER.
No. 286,882. Patented Oct. 16, 1883.
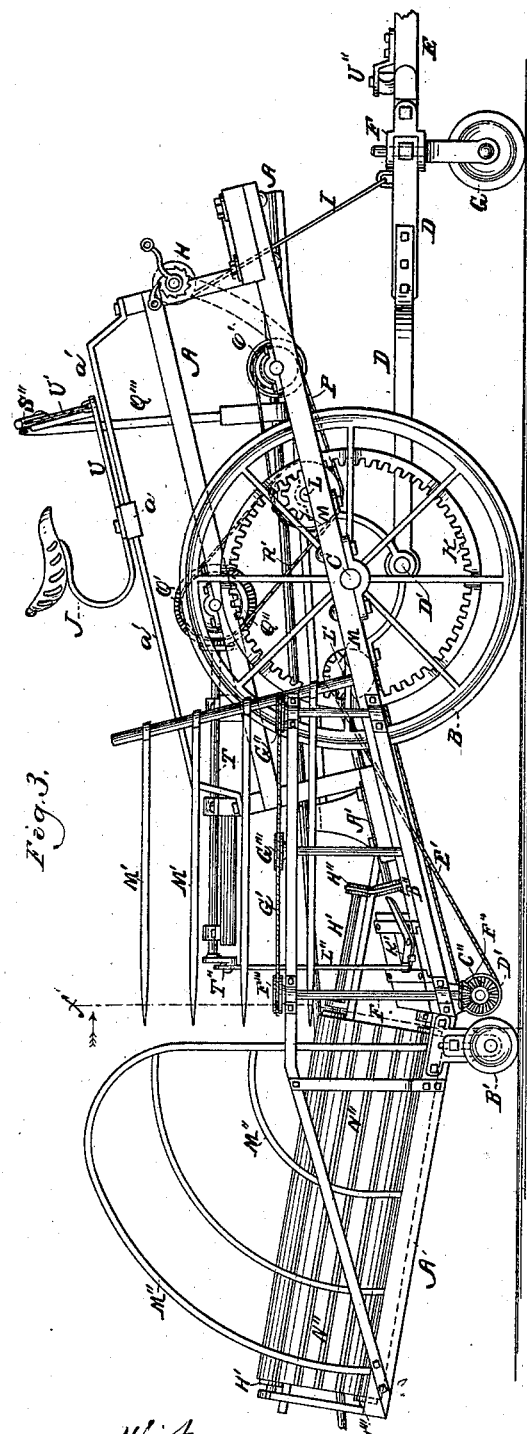
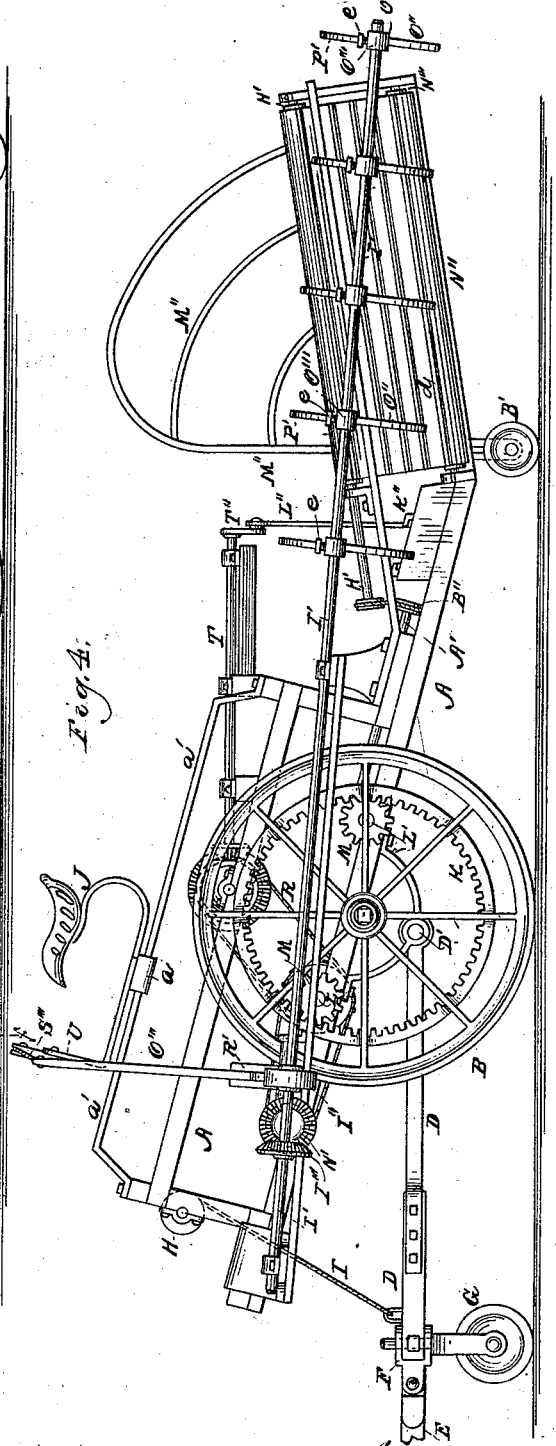
Witnesses.
Inventor,
Solomon F. Weaver
per. F. F. Warner
his Attorney.

(No Model.) 3 Sheets—Sheet 3.
S. F. WEAVER.
CORN HARVESTER.
No. 286,882. Patented Oct. 16, 1883.
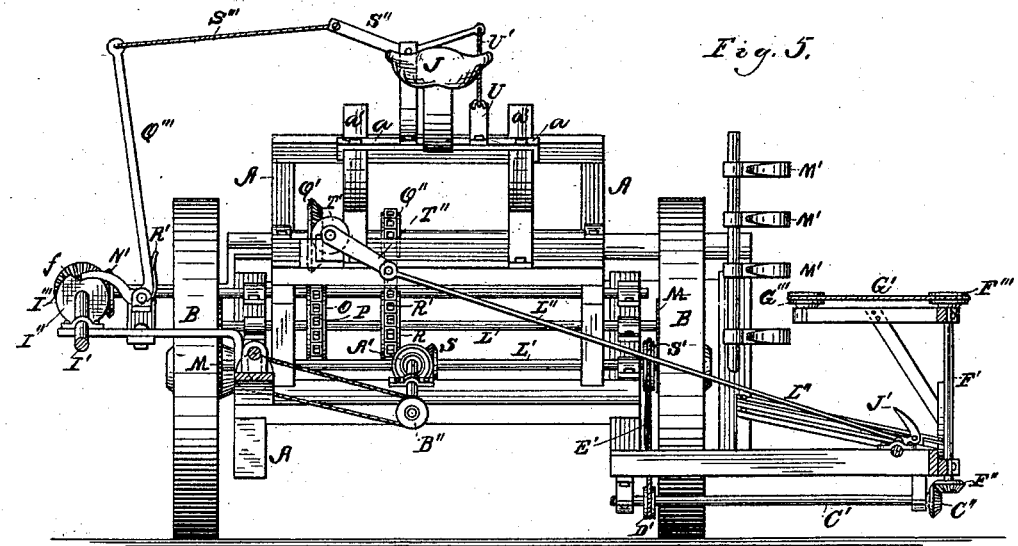
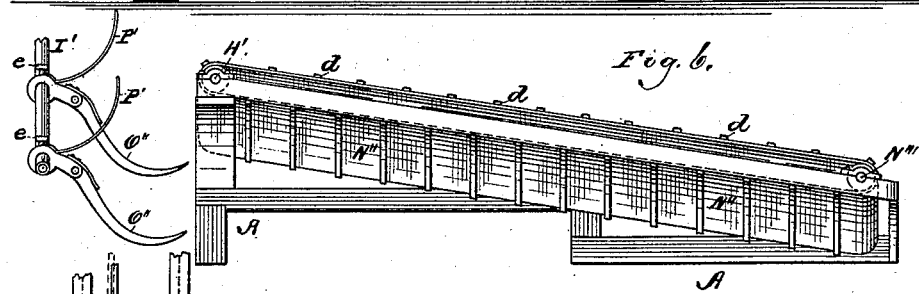
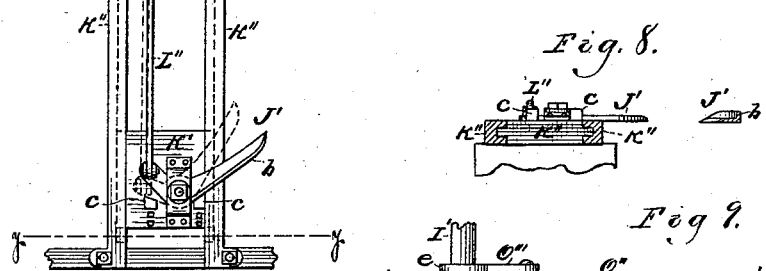
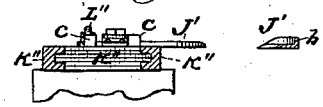
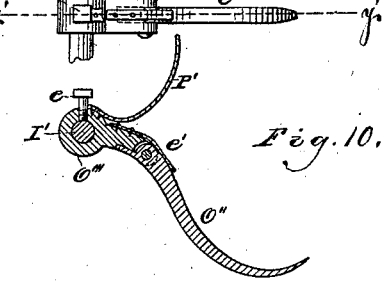
Witnesses
Inventor.
Solomon F. Weaver
per F. F. Warner
his Attorney.

UNITED STATES PATENT OFFICE.

SOLOMON F. WEAVER, OF NEAR PORTIS, KANSAS.

CORN-HARVESTER.

SPECIFICATION forming part of Letters Patent No. 286,882, dated October 16, 1883.

Application filed June 23, 1883. (No model.)

*To all whom it may concern:*

Be it known that I, SOLOMON F. WEAVER, residing near Portis, in the county of Osborne and State of Kansas, have invented certain new and useful Improvements in Corn-Harvesters, of which the following, in connection with the accompanying drawings, is a specification.

In the drawings, Figure 1 is a top or plan view of a corn-harvester embodying my improvements. Fig. 2 is a sectional detail in the plane of the line $x\,x$, Fig. 1, viewed in the direction indicated by the arrow there shown, and showing a portion of the means employed for rotating the shaft to which the dropper-arms are applied and for controlling their action. Fig. 3 is a side elevation of one side of the harvester. Fig. 4 is a like representation of the other side. Fig. 5 is a rear elevation, partly in section. Fig. 6 is a detail, the same being a representation of the conveyer viewed from behind, and also showing the position of the droppers with relation thereto. Fig. 7 is a detail, the same being a top view of the cutter and its supports. Fig. 8 is a section on line $y\,y$ of Fig. 7. Fig. 9 is a detail, the same being a top view of one of the dropper-arms applied to its shaft; and Fig. 10 is a section on line $y'\,y'$, Fig. 9.

The object of my invention is to provide improved means for cutting green or grown corn or other like plants and for arranging and depositing automatically the cut stalks or corn in suitable bunches and placing them out of the way of further operations of the machine, all of which will be found fully explained and set forth herein.

Like letters of reference indicate like parts.

A is the frame of the harvester. B B are the draft-wheels, and C is an axle on which they are mounted. The frame is supported on the axle C, and is capable of being tilted vertically thereon, as and for the purposes more fully hereinafter explained. The rear part of the frame A meets the main part thereof anglingly, as shown, and is supported by a vertically-adjustable ground-wheel, B', when the machine is in use.

D is a draft-frame, which is forked, as is clearly shown in Fig. 1, and its rear ends turn on a shaft or cross-rod, D', arranged lower than the axle C, and suitably connected to the central part of the main portion of the frame A.

E is the draft-tongue or pole, and F is a clevis connecting it to the forward end of the frame D.

G is a caster, the stem of which passes up through the clevis F, the latter of which is capable of swinging laterally on the said stem. The tongue E is so jointed to the clevis as to be capable of being tilted vertically, and an ordinary knuckle-joint will permit of such movement.

H is a windlass having suitable bearings on uprights forming a part of the forward portion of the frame A, and I is a rope or cord attached to the said windlass and to the forward part of the frame D.

J is the driver's seat, which is mounted on a cross-bar, $a$, in turn resting on bars $a'\,a'$, supported by the frame. The seat J is adjustable laterally on the bar $a$, and the latter may be moved back and forth on the bars $a'\,a'$. When the implement is adjusted for work, it rides upon the wheels B B, B', and G, and the cord I is slack, but when the implement is not at work, or on the road or being conveyed to and from the field, I lower the forward end of the frame A by means of the windlass H, turning the latter in such a direction as to draw the forward part of the said frame down to or toward the frame D, thus tilting up the rear part of the frame A, so that the implement then rides only on the wheels B B and caster G, and so that the knife or cutter will ride above obstructions, as will hereinafter more fully appear. The frame D, wheel G, and tongue E should be heavy enough not to be raised when the frame A is tilted in the manner described. In the example shown the forward part of the frame A is straight, or in a line with its main part, and when so made the frame may be tilted sufficiently for all practicable purposes; but to increase the extent of the tilting movement I intend, in practice, either to make the frame inclined or curved upward at its forward part, so that it will not be liable to ride on or come in contact with the frame D, and thereby prevent a sufficient tilting movement, it being understood that the frame A will be tilted automatically while the implement is working on uneven ground.

K K are internal-cog wheels attached to the wheels B B, and concentric therewith.

L and L' are transverse shafts, and M M are spur-wheels or pinions on the said shafts, and engaging the cogs K K, respectively. N is a shaft having on its outer end a miter-wheel, N'. O and O' are sprocket-wheels on the shafts L and N, respectively, and P is a drive-chain on the said sprocket-wheels. Q is a shaft carrying a beveled-gear wheel, Q', and a sprocket-wheel, Q". R is a sprocket-wheel on the shaft L, and R' is a drive-chain on the sprockets Q" and R. S is a beveled-gear wheel, and S' is a pulley, both on the shaft L'. T is a shaft carrying a beveled-gear wheel, T', engaging the gear-wheel Q', and having on its outer end a crank-arm, T." A' is a shaft carrying a beveled-gear wheel, A", and a pulley, B". The gear A" engages the gear S. C' is a shaft carrying a beveled-gear wheel, C", and a belt-wheel, D'. E' is a crossed drive-belt passing over the pulleys S' and D'. F' is a vertical shaft carrying a beveled-gear wheel, F", and a pulley, F'". G' is a belt on the pulley F'", and also on pulleys G" and G'". H' is a shaft having in it a pulley, H", and H'" is a belt on the pulleys B" and H". I' is a shaft carrying a wheel, I", having in it a beveled notch, $f$, and a miter-wheel, I'". The gear-wheel I'" engages the gear N'. All these shafts turn in suitable bearings, and are employed, in connection with their wheels, pulleys, and drive belts or ropes, for the purpose of communicating motion to the various working parts of the implement; and it will hereinafter appear that this system of gearing may be varied or modified without a substantial departure from the essential features of my invention.

J' is the cutter or knife. This knife is angular in form, and K' is a sliding block, to which it is pivoted.

$b$ is the back of the knife, and this back extends somewhat above the upper face of the blade.

K" K" are grooved ways, somewhat higher at their inner than at their outer ends, and in which the block K' travels, the said block being ribbed along its edges to enter the grooves in K" K", as is clearly shown in Fig. 8.

L" is a pitman connecting the shorter arm of the cutter J' to the crank T".

$c\ c$ are vertical adjustable studs or stops on the block K', for the purpose of limiting and varying the swinging movement of the cutter on its pivot.

M' M' are weak springs or guides, for the purpose hereinafter referred to.

M" M" are guides or guards.

N" is an inclined endless apron or conveyer, supported at its higher end on the shaft H' and at the other end on the roller N'".

$d\ d$ are transverse slats or ribs on the apron N". It is also tilted, as indicated in Figs. 3, 4, and 6, its inner edges being lower than the outer ones. The lower inner corner of this apron is located near the cutter J', as shown.

O" O" are dropper-arms, knuckle-jointed to blocks O'" O'", adjustably mounted on the shaft I', and there retained by means of set-screws $e\ e$, as is clearly shown in Figs. 9 and 10. The lower or outer ends of the arms O" O" may be raised, and $e'\ e'$ are springs to return them to their proper position and render them yielding, the said arms being tongued, as shown, at their upper ends, so as to be properly supported.

P' P' are spring-arms, also attached to the blocks O'" O'".

Q'" is a stop or bent lever pivoted to the frame A, and having the end of its shorter arm resting in the notch of the wheel or block I", as is clearly shown in Figs. 1, 2, and 5; and R' is a spring for holding it yieldingly in the said notch.

S" is a lever arranged near the driver's seat and connected to the lever Q'" by means of a cord, S'".

U is a treadle, and U' is a cord connecting it to the lever S".

The wheel I'" has a cogless portion, $e"$, so that it will not be rotated a full revolution by the wheel N. When the lever Q'" is in the notch of the wheel I", the cogs of the wheel N' are in the cogless part of the wheel I'".

U" is the double-tree.

The operation of the improvement is as follows: In drawing this harvester upon the road I tilt up its rear end by means of the windlass H, as already described. Upon reaching the stalks to be cut I lower the rear end or part of the machine until the wheel B' will ride upon the ground, and I set or adjust the upright of that wheel vertically, as may be desired, in order that the knife or cutter J' may be at the proper distance above the ground. The machine is then drawn forward in such a position with relation to the cornstalks that they will be bent over somewhat toward the implement by means of the belt G' and pass between the pulley G'" and the springs M' M', when they will stand in a somewhat inclined position in front of the outer way, K", and also in position to be cut by the cutter J', as will clearly be perceived on reference to Fig. 1. While the implement moves forward in this manner the shaft T is revolving, and the knife J' and block K, are moved laterally by means of the pitman L", the said cutter shearing against the outer way, K", the block K' being so moved for the reason that the cutter is pivoted to the said block and connected to the pitman, and has its vibrating movement on its pivot limited by the stops $c\ c$, the cutter being held open when resting against one of those stops and closed when resting against the other, as is clearly shown in Fig. 7. This lateral inward movement of the cutter J', while in its open position, cuts the stalks, which are prevented by the belt G' and springs M' M' from falling outward after being cut. When the pitman L moves in the opposite direction, the knife closes and the blade K' returns to its original position, after which the knife will again be opened and moved in such a direction as to cut the stalks then standing in front of it. This movement of the cutter is continued at quite a rapid rate as the machine is drawn along. The cut corn is prevented by the back $b$ from passing over the blade, and the corn is swept or thrown toward and upon the conveyer N'' by the closing movement of the cutter. The belt G' and springs M' M' also aid in delivering the cut stalks upon the apron. By bending the stalks over in this manner just before they are cut, I facilitate the operation of cutting it and prevent the stalks from binding upon the cutter, the result being the same as when the corn is bent over by hand and cut with an ordinary hand-sickle, which strikes the stalks on their convex or bulging side. The stalks, after being deposited upon the conveyer N'', are carried by it toward the droppers O'' O'' and delivered upon them. The apron N'', by being highest along its rear edge, prevents the cut stalks from working off therefrom in that direction, and also prevents the conveyer from dragging on the ground when the wheels B B pass from level to higher ground, or over obstructions. As soon as a sufficient amount of cut stalks is deposited in the arms O'' O'' the latter drop downward, owing to the gravity of the stalks, the weight of the stalks becoming sufficient to push the end of the lever Q''' out of the notch in the wheel I'', and thereby rotating the shaft I'' sufficiently to carry the cogs of the wheel I''' into engagement with those of the wheel N'. This engagement causes the positive rotation of the shaft I' until the arms O'' O'' are returned to their original position, at which time the lever Q''' drops into its notch in the wheel I'' and the cogs of the wheel N' are in the cogless portion of the wheel I'''. In this manner the cut stalks will be dropped in suitable bundles along the field. If it should be desirable to drop the corn in smaller bundles, the lever Q''' may be raised from its notch by the driver. Means may also be provided, if deemed best, for varying the pressure of the spring R' upon the lever Q'''. By jointing the arms O'' O'' in the manner shown and described they will yield in case they should strike the ground during the rotation of the shaft I'. The springs P' P' prevent the stalks from being thrown or pushed entirely over the droppers. The springs $e'$ $e'$ return the arms O'' O'' to their proper positions after they yield in case of contact with the ground.

It will be perceived, particularly on reference to Fig. 4, that the shaft I' extends horizontally across the delivery end of the conveyer N'' while the conveyer is inclined, as there shown. If it should be deemed best to have the droppers arranged more in accordance with the inclination of the conveyer, the bearings of the said shaft may be correspondingly located, its connection with the driving mechanism or gear being retained. For example, the front bearings of the shaft I' may be lowered, and the gear for driving it also lowered.

It is to be understood that the rear part of the frame and the parts mounted on it should be heavy enough not to be tilted up by the driving mechanism located in front of the axle C.

Having thus described my invention, what I claim as new, and desire to secure by Letters Patent, is—

1. The combination, in a corn-harvester, of the draft-wheels B B and their axle C, the frame A, mounted tiltingly on the axle C, and carrying the working-gear and cutter, the draft-frame D, hinged to the cross bar or rod D', connected to the frame A and located below the axle C, the caster-wheel G, the ground-wheel B', and a windlass turning in bearings in the frame A, and having its cord or rope connected to the frame D, all arranged for operation together, substantially as and for the purposes set forth.

2. The combination, in a corn-harvester, of the pivoted stalk-cutter J', the sliding block K', and the pitman L'', the said cutter being pivoted to the said block, and the said pitman being jointed to the said cutter, substantially as and for the purposes specified.

3. The combination, in a corn-harvester, of the pivoted stalk-cutter J', the sliding block K', the stops $c$ $c$, and the pitman L'', substantially as and for the purposes specified.

4. The combination, with the stalk-cutter of a corn-harvester, of the traveling belt or stalk-bender G' and the yielding arms or springs M' M', substantially as and for the purposes specified.

5. The combination, in a corn-harvester, of the rotary shaft I', carrying dropper-arms located to receive the cut stalks from a conveyer, the notched wheel I'', mounted rigidly on the said shaft, the yielding stop Q''', the cog-wheel I''', having a cogless portion, $e''$, and the driving cog-wheel N', substantially as and for the purposes specified.

6. The combination, with the stalk-conveyer of a corn-harvester, of the rotary shaft I', the blocks O''' O''', and the dropper-arms O'' O'', hinged or jointed to the said blocks, and adapted to fold upwardly, substantially as and for the purposes specified.

7. The combination, with each other and the dropper-shaft and stalk-conveyer of a corn-harvester, of the blocks O''' O''', the dropper-arms O'' O'', hinged or jointed to the said blocks, and the springs $e'$ $e'$, substantially as and for the purposes set forth.

8. The combination, with the dropper-shaft and stalk-conveyer of a corn-harvester, of the adjustable blocks O''' O''', the dropper-arms O'' O'', hinged or jointed to the said blocks, and the springs $e'\ e'$, substantially as and for the purposes set forth.

9. The combination, with the dropper-shaft and dropper-arms of a corn-harvester, of the springs $e'\ e'$ and the springs $P'\ P'$, the said arms being jointed to fold upwardly, and the springs $e'\ e'$ being arranged to hold the said arms yieldingly in their lowest position, substantially as and for the purposes specified.

SOLOMON F. WEAVER.

Witnesses:
F. F. WARNER,
J. B. HALPENNY.